(12) United States Patent
Brinkmann et al.

(10) Patent No.: US 7,387,413 B2
(45) Date of Patent: Jun. 17, 2008

(54) LIGHTING APPARATUS, LENS AND METHOD OF MAKING THE LENS

(75) Inventors: Matthias Brinkmann, Mainz-Kastel (DE); Edgar Pawlowski, Stadecken-Elsheim (DE); Wolfram Beier, Essenheim (DE); Rolf Harmgardt, Alfeld/Leine (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 10/895,155

(22) Filed: Jul. 20, 2004

(65) Prior Publication Data

US 2005/0052742 A1    Mar. 10, 2005

(30) Foreign Application Priority Data

Jul. 23, 2003    (DE) ................ 103 33 370

(51) Int. Cl.
  *G01B 13/18*    (2006.01)
  *B60Q 1/00*    (2006.01)
  *G02B 27/44*    (2006.01)

(52) U.S. Cl. .............. 362/460; 359/566; 362/227; 362/539

(58) Field of Classification Search ........ 359/566, 359/13, 19, 543, 742, 15, 565; 362/296, 362/510, 539, 538, 459, 460, 487, 507, 453, 362/227, 228, 235, 464, 495; 353/29, 30
See application file for complete search history.

(56) References Cited

U.S. PATENT DOCUMENTS 1,397,822 A * 11/1921 Peters .................. 362/341
1,955,599 A * 4/1934 Lamblin-Parent ........... 362/215
3,560,921 A * 2/1971 Lopez ..................... 340/461
3,975,515 A   8/1976 Wajaroff et al.
4,771,372 A   9/1988 Litetar
5,089,023 A * 2/1992 Swanson .................. 623/6.25
5,180,218 A * 1/1993 Ohshio ..................... 362/538
5,257,132 A * 10/1993 Ceglio et al. .............. 359/565
5,323,302 A   6/1994 Bertling et al.
5,459,246 A   10/1995 Jaeger et al.

FOREIGN PATENT DOCUMENTS

| DE | 23 49 050 | 4/1975 |
| DE | 42 15 584 | 11/1983 |
| DE | 350 70 13 | 2/1985 |
| DE | 42 15 485 A1 | 11/1993 |
| DE | EP000624753 A2 * | 11/1994 |
| FR | 2 785 364 | 5/2000 |
| WO | 99/00623 | 1/1999 |

* cited by examiner

*Primary Examiner*—Audrey Y Chang
(74) *Attorney, Agent, or Firm*—Michael J. Striker

(57) ABSTRACT

In order to meet the legal requirements regarding color of light from a headlight, especially at the light-dark boundary and how much scattered light can occur in the dark region, a lens (5) is provided, which has a diffractive structure on at least one of its surfaces (8). This lens (5) is built into a headlight with a diaphragm (4) arranged between the lens (5) and a light source (3) so that the diffractive structure is arranged substantially only in a region of the lens surface that is not masked by the diaphragm. In various embodiments a computer-generated hologram (17a-17e) can be arranged in the other region of the lens surface that is masked by the diaphragm, so that the lighting apparatus can perform other functions, such as improving driver visibility, displaying an image, measuring the distance to an object or detecting rain or snow.

6 Claims, 15 Drawing Sheets

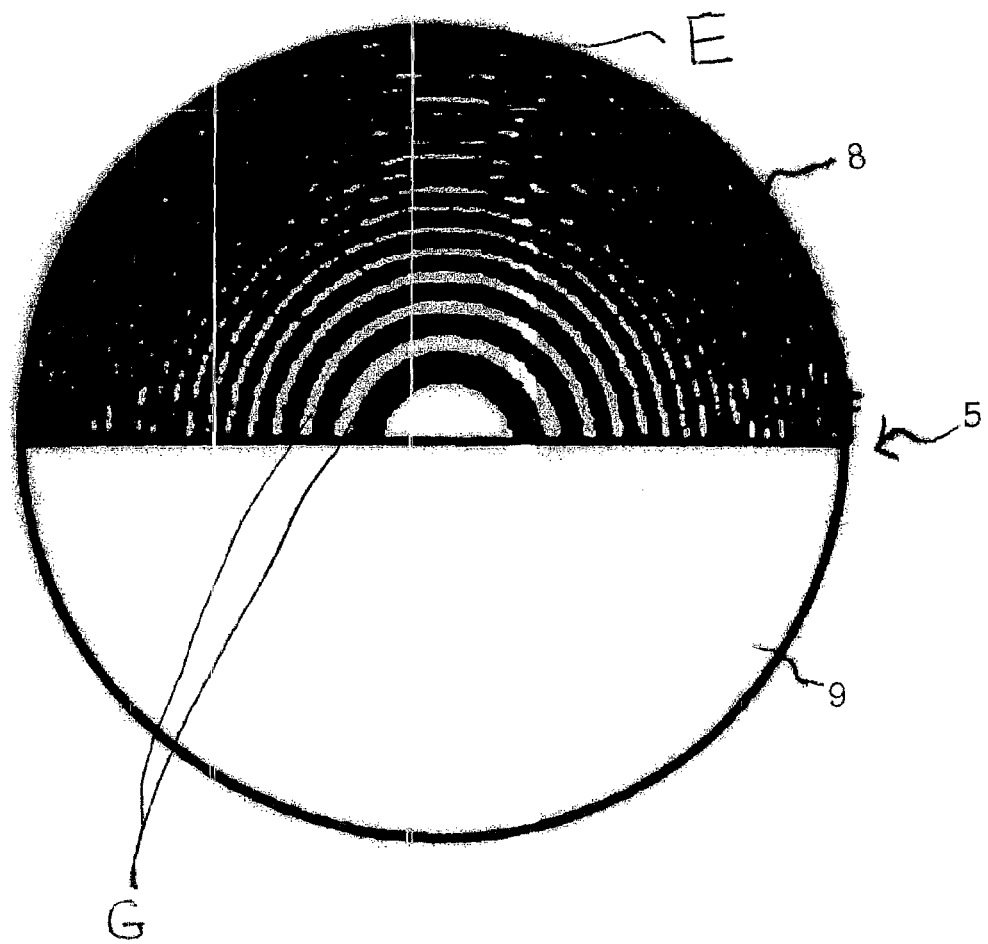

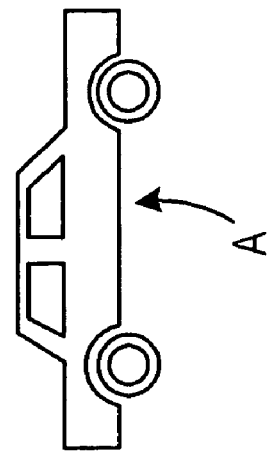
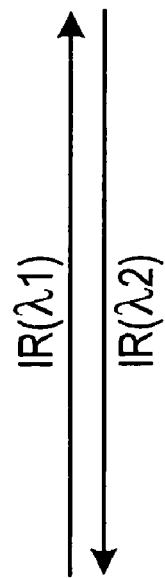
FIG. 13a
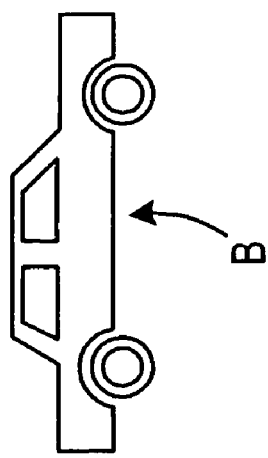

LIGHTING APPARATUS, LENS AND METHOD OF MAKING THE LENS

BACKGROUND OF THE INVENTION

1. Field of the Invention

The present invention relates to a lighting apparatus, especially for the automotive field, which comprises a light source, a lens having a diffractive structure on at least one of its surfaces and a diaphragm arranged between the light source and the lens. Furthermore the invention also relates to a lens of this type for the above-described lighting device and to a method of making this lens.

2. Description of the Related Art

A lighting apparatus is described in DE 42 15 584 A1, which has a light source, a reflector and a light disk. A diffraction grating is arranged between the light source and the light disk, through which the light reflected from the reflector and originating from light source travels. The diffraction grating has regions with micro-prisms as diffraction elements, through which light aimed in a certain direction is diffracted or deflected. The diffraction-optic elements are formed as scattering elements in other regions of the diffraction grating. These scattering elements distribute or scatter the light uniformly within a certain angular range. This sort of lighting device can, for example, be used as an auto headlight.

A headlight with a parabolic reflector based on these principles is described in DE 42 15 584 A1. It comprises a lamp, a parabolic reflector, a diaphragm and a scattering disk, which is built into the front disk.

A comparable auto signal light is also described in FR 2 785 364 A1. This light comprises a light source and a screen, which has the diffractive elements at least in one region, in order to produce a spread out light beam, whose angular distribution is continuous. The screen region is divided into blocks, which each have a diffractive structure. A very uniform light beam may be produced by division into individual blocks, which all produce the same light distribution.

A motor vehicle headlight for low beam or fog light is described in DE 35 07 013 A1. This headlight has a non-color correcting objective, which images the diaphragm edge as a light-dark boundary of the light beam on the road, and a projection element, which guides the rays of the light beam forming a color fringe at the light-dark boundary into its bright region. Since the light beam again mixes the different colors, the white light beam prescribed by law is produced without the troublesome color fringe. If a corrective element, which divides the light beam propagated from the objective into a differentiated light beam, i.e. into very many small light beams, is used, a white light-dark boundary is obtained with a slight coloration. A suitable corrective element has a cylindrical lens or an annular lens, which are formed as a collecting lens or a scattering lens with different indices of refraction and/or widths. These lenses require that the useful surfaces of the corrective elements must be only partially covered. The objective and the corrective element can be made from one piece. Pressing especially is used to make the part or side of the objective including the corrective element.

The so-called poly-ellipsoidal headlight (PES), which has a plane-aspheric lens instead of a light scattering disk, has been available since the mid-80s. In more recent times the lens has been lens is mated to a threefold ellipsoid reflector or also to a free-form reflecting surface.

The so-called poly-ellipsoidal headlight (PES) is described, for example, in WO 99/00623 A1. The motor vehicle headlight described there comprises a light source and a lens. The lens has a non-holographic surface structure, which acts as diffractive microstructure. Preferably refractive elements, i.e. lenses, are provided with a diffractive microstructure. The refractive-diffractive elements can be designed so that certain optical functions can be performed by the diffractive microstructure. These functions result in altogether thinner refractive elements without thickness variations. The most important optical function is based on legal requirements, which define or proscribe the direction in which the light beam is guided and the intensity distribution it must have over the surface. Additional parameters, which can be controlled by the design of the diffractive microstructure, are the uniformity, the color and light scattering properties. The facts that blue light is refracted most strongly and red light is diffracted most strongly are used for color correction. Since the design of the lens and the diffractive microstructure are harmonized with each other, the chromatic aberration of both elements can be compensated. The scattered light can also be compensated in the manner described according to WO 99/00623. Furthermore the diffractive microstructure can be used to provide the light from the signal lights with a predetermined pattern. For example the trademark of the automobile manufacturer can be made to appear in the brake lights or back lights. Also the color of the light beam can be adjusted by means of the diffractive microstructure. Thus one could conceive that different colors could be integrated in lights for different applications by means of diffractive microstructures.

Front headlights for low beam light generally produce a light distribution, which must be wider than it is higher. This is primarily produced by a threefold-ellipsoidal reflector with different half axes in the case of a poly-ellipsoidal headlight (PES). The upper half of the light beam is masked by a diaphragm and projected by a lens on the street. A sharp image of the diaphragm is thereby produced at a distance of about 10 meters. The transition between the illuminated region and the region blocked by the diaphragm is called the light-dark boundary. This light-dark boundary is adjustable so that it is clearly sharper with a poly-ellipsoidal headlight (PES) than with a headlight with a paraboloid reflector. In the standard headlight test the light distribution of a headlight on a measuring wall at a distance of 25 meters from the headlight is divided into a number of different zones and a plurality of test points. A significant parameter is the light intensity at the so-called HV point, which is about 25 cm above the light-dark boundary in the center of the light beam. There the light intensity may not exceed a defined value. The HV point is in the dark region of the light intensity distribution. When the image is not focussed or sharp the light-dark boundary spreads out and the light intensity at the HV point exceeds the permitted value. The light intensity at the HV point is thus also a measure of the scattered light. Up to now it has proven to be very difficult to keep the light intensity at the HV point below the permitted limiting value while maintaining all the remaining test standards.

SUMMARY OF THE INVENTION

It is an object of the present invention to provide a lighting apparatus and/or a lens suitable for it, which guarantees that the light intensity is as low as possible at the HV point.

This object and others, which will be made more apparent hereinafter, are attained in a lighting apparatus, especially for the automotive field, which has a light source, a lens, which has a diffractive structure arranged on at least one surface, and a diaphragm arranged between the light source and the lens. The invention also includes the lens that is specially adapted for use in the lighting apparatus.

According to the invention the diffractive structure is arranged substantially only in a region of the lens that is not masked or blocked off by the diaphragm.

Surprisingly it has been shown that the portion of scattered light at the HV point can be reduced when the diffractive structure is simply omitted from the region of the lens, which is blocked or masked by the diaphragm, since this region is not illuminated by the light source. Comparative measurements between lenses, which have this diffractive microstructure substantially only in the illuminated region, and lenses, which have this diffractive microstructure over their entire surface, have shown that an improvement of about a factor of 10 can be attained at the HV point. That means that the light intensity at the HV point is reduced by a factor of ten. It is especially surprising in the case of the present invention that in —hindsight —a very simple feature can achieve such a dramatically great effect.

Advantageously the diffractive structure is arranged on the inside, also on the side facing toward or closest to the light source. Because of that the diffractive structure is protected from mechanical influences and dirt and the like.

This is provided particularly when the lens has a planar surface on the side facing toward the light source and a convex surface on the side facing away from the light source. Then the diffractive structure can be easily introduced on the planar surface. When the diffractive structure is located on the planar surface, the diffractive structure may be produced separately on a foil, which can be attached, for example, by adhesive on the planar side of the lens.

Generally it is also advantageous to provide the diffractive structure on the convex side. Of course the appropriate tools are complicated, but generally guarantee improved temperature control. This has a positive effect on the especially during mass production.

It has proven to be especially advantageous when the area covered by the diffractive structure on the lens surface corresponds to the area within a semicircle in the conventional poly-ellipsoidal headlight (PES), which has a circular-cross-sectioned lens and in which the lower half of the lens is masked.

In a preferred embodiment of the lighting apparatus or lens, the boundary between the area with the diffractive structure and the area without it on the lens is formed according to the geometry of the diaphragm. In this way the amount of scattered light in the dark region from the headlight can be optimally reduced.

From the standpoint of manufacturing it is of advantage when the area covered by the diffractive structure on the lens surface corresponds to the area within half of a circular ring. When pressing is used to produce the lens with the diffractive structure, a depression or indentation is formed in the center of the lens on the planar side. Since a diffractive structure is not at all provided there, it is possible to make the lens with the diffractive structure without additional effort in a single pressing step. The design of the lens and the diffractive structure must then be optimized so that the scattered light portion is not so high in the dark region.

The lens can comprise glass, preferably having an oxidic or silicate multi-component glass composition, and is made by pressing. The lens according to the invention may also be made from plastic, for example by injection molding and/or UV- and hot stamping methods. The latter methods guarantee a true shape. Transparent and storage stable plastic materials are preferred as the plastics from which the lens is made. Especially e.g. polymethylmethacrylimide (PMMI), which has a high temperature resistance, or also cycloolefin copolymers (COC) or cycloolefin polymers (COP), which take up no water, are preferred.

In an especially preferred embodiment the lens has a computer-generated hologram in a region masked by the diaphragm. The lighting apparatus according to the invention can perform additional functions with the help of the computer-generated hologram. For example, a logo can be projected on the street or on the cover disk for the lighting apparatus with the help of the computer-generated hologram. The operability of the lighting apparatus including the lens and the light source can be controlled. The night visibility can be improved, the distance to an object can be measured or rain or snow can be detected in this way. A light source is required for all these applications. This light source can be e.g. a laser with the required wavelength range. The light source for the additional functions can also be the light source used in the lighting apparatus. Light from the main light source in the lighting apparatus can be conducted to the computer-generated hologram by means of an optical fiber or fiber optic light guide. Also optical data communication with other automobiles is possible by building transceivers into the apparatus.

In other preferred embodiments the color fringe at the light-dark boundary can be adjusted to a color, which is not white, by varying the phase relationship and/or structure depth of the diffractive structure. This can also serve to inform a vehicle traveling in opposing traffic of type of the oncoming vehicle or the speed at which a following or oncoming vehicle is moving. This especially can improve the safety during passing at night. Automobile manufacturers could also use different colors as identification marks for their products.

The light apparatus according to the invention may be operated with any light source, for example photodiodes, or light, which is conducted through optical fibers or fiber optic cables, which also at least partially forms a good beam. However those conventional light sources used in automotive applications, whose lighting power is best, when the light source is arranged in a reflector, are preferred. The already known threefold ellipsoidal reflectors are especially preferred in the lighting apparatus.

BRIEF DESCRIPTION OF THE DRAWING

The objects, features and advantages of the invention will now be illustrated in more detail with the aid of the following description of the preferred embodiments, with reference to the accompanying figures in which:

FIG. 4a is a plan view of a geometric design of a first embodiment of a lens according to the invention;

FIGS. 8 to 12, 13a and 13b are respective cross-sectional views showing applications of a lens with CGH.

DESCRIPTION OF THE PREFERRED EMBODIMENTS

Figure 1:
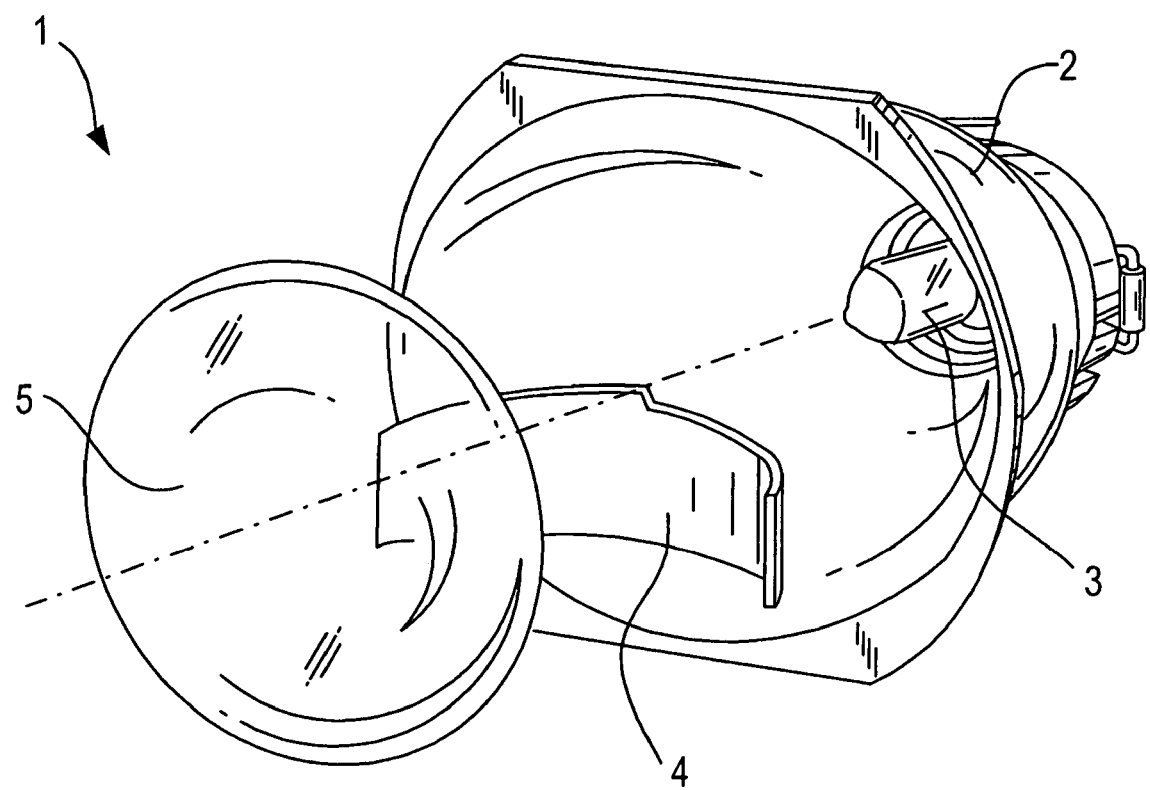
FIG. 1 is an exploded perspective view of the structure of a conventional DE headlight.

FIG. 1 shows the main structure of a DE headlight as it is known in the art. The DE headlight 1 comprises a polyellipsoidal reflector 2, a halogen light source 3, a diaphragm 4 and a lens 5. The diaphragm 4 is arranged in the path of the light rays between the halogen light source 3 and the lens 5. The usually used diaphragm 4 blocks the lower half of the light beam, so that the headlight lights the ground sooner or closer after passing through the lens. The light beam is deflected down especially toward the right side in order to blind the driver of an oncoming vehicle as little as possible by building a step into the upper edge of the diaphragm 4.

Figure 2:
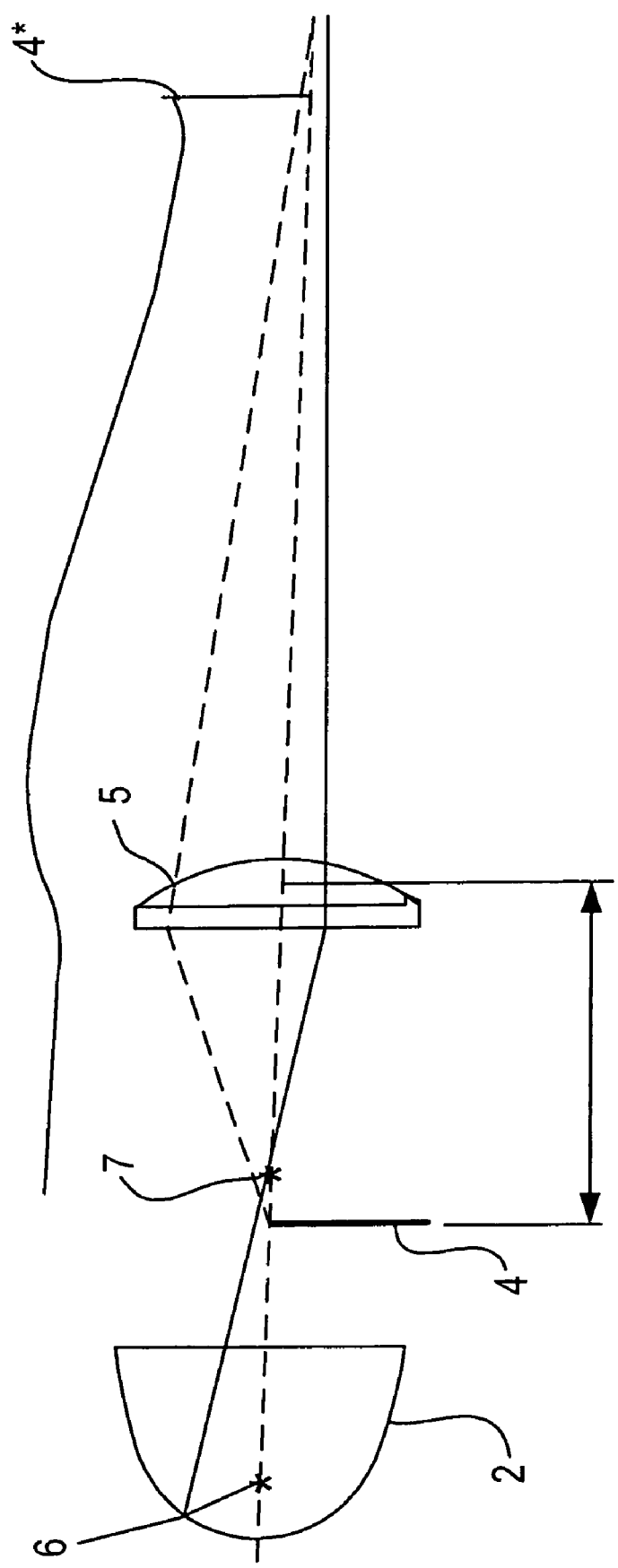
FIG. 2 is a diagrammatic cross-sectional view of the path of light rays in a DE headlight.

Light rays in a DE headlight are shown in FIG. 2. A light source is mounted in a reflector 2 at a first focal point 6. The light is focused at a second focal point 7, which is shortly downstream of the diaphragm 4, because of the ellipsoidal shape of the reflector. After that the individual light rays pass through the lens 5 and produce an image of the diaphragm 4*.

Figure 3:
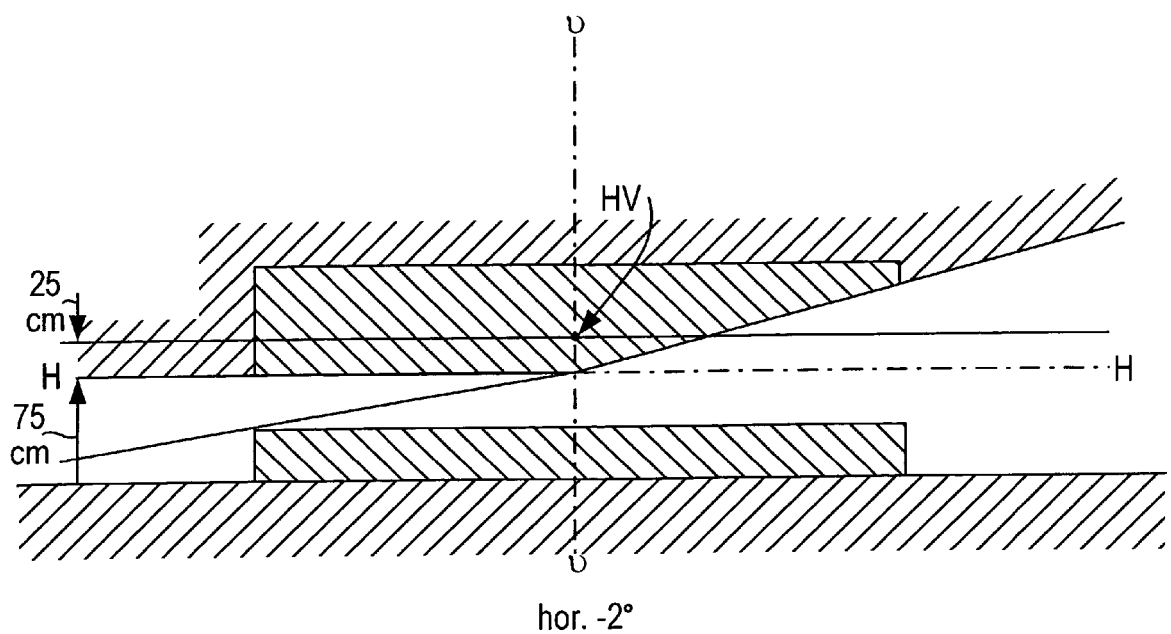
FIG. 3 is a light distribution diagram showing the position at which the intensity at the HV point is measured.

The decisive parameter is the light intensity at the HV point. As shown in FIG. 3 the HV point is 25 cm above the illuminated region and 25 meters from the lens. In the horizontal direction the HV point is exactly above the step in the light-dark boundary, which is produced by the step built into the edge of the diaphragm 4.

Figure 4B:
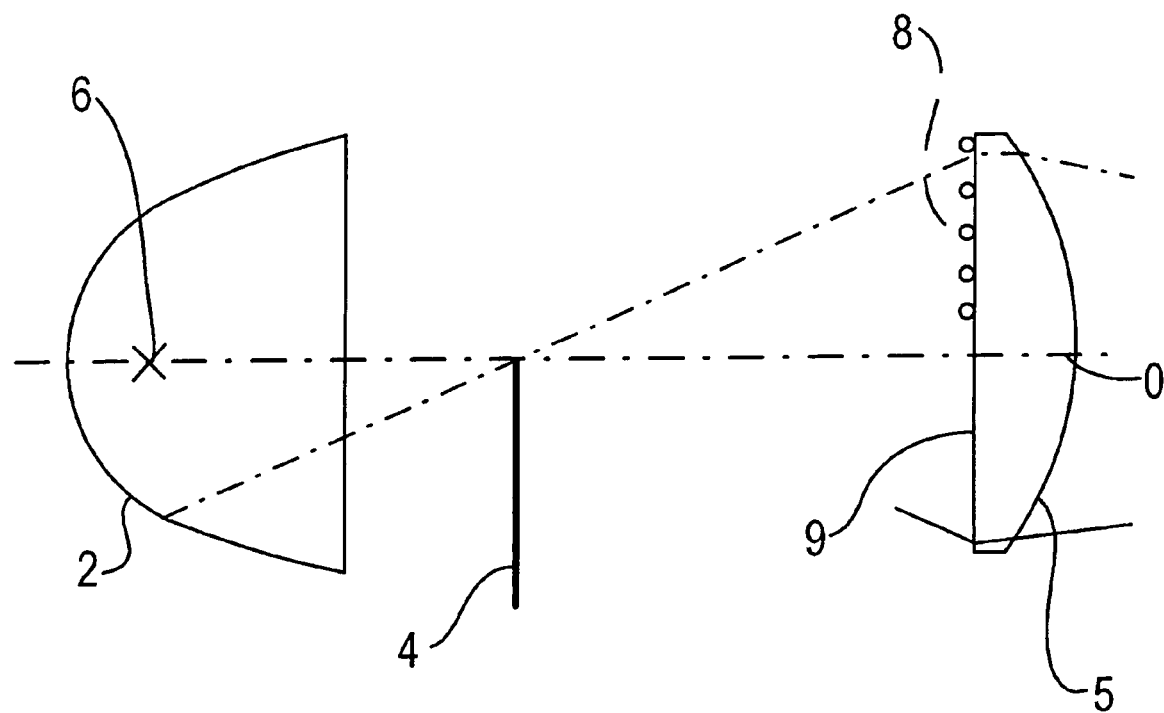
FIG. 4b is a cross-sectional view of a lighting apparatus in which the lens according to the invention shown in FIG. 4a is arranged.

FIG. 4a shows a lens 5 according to the invention, which has a region 8 with a diffractive structure and a region 9 without diffractive structure. This lens 5 is built into the path of the light rays in such a way that the region 8 with the diffractive structure is located above the optic axis O and the region 9 without diffractive structure is located below the optic axis O (see FIG. 4b). The lens 5 of FIG. 4a preferably has a circular outer peripheral edge E and the diffractive structure comprises curved grooves G, especially concentric circular arc-shaped grooves, which are shaped according to the circular outer peripheral edge.

Measurements were performed on the above-described lens 5 and on a conventional lens, which has a diffractive structure over its entire plane surface corresponding to the diffractive structure in the region 8 of the lens 5 according to the invention. These measurements were performed with the same structure and identical boundary conditions. Over 10 Lux of light intensity was measured at the HV point in the case of the prior art lens, which had a diffractive structure over its entire surface. Only 1.4 Lux were measured at the HV point with the lens shown in FIG. 4a. Furthermore it was established that the discrepancy between simulated light intensity at the HV point and measured light intensity at the HV point was less than 40%. This sort of low light intensity is a very good value.

Figure 5:
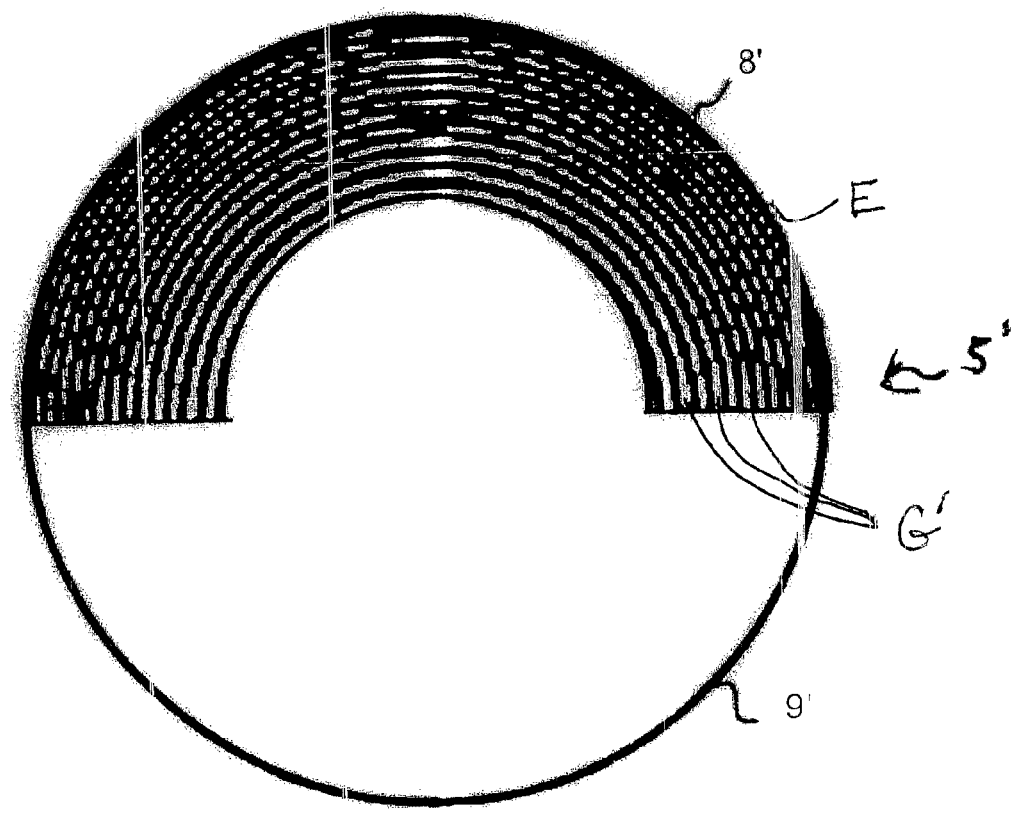
FIG. 5 is a plan view of a geometric design of a second embodiment of a lens according to the invention.

The lens 5' shown in FIG. 5 has a diffractive region 8', which extends only between the outer peripheral edge E' of the lens and a semicircle SC, whose center coincides with the center of the lens 5 The surface 9' without the diffractive structure is thus complementary. The lens 5' of FIG. 5 preferably has a circular outer peripheral edge E' and the diffractive structure comprises curved grooves G', particularly concentric circular arc-shaped grooves, which are shaped according to the circular outer peripheral edge E'. This lens 5' was made by pressing a melted glass gob in one step. Thus the lens and the diffractive structure would both be formed at the same time. Diffractive structures, which vary in the micrometer range, were not introduced into the center of the lens, because of the depression formed in the center due to pressing. The reduction of the scattered light portion at the HV point is still significant for this embodiment.

Figure 6:
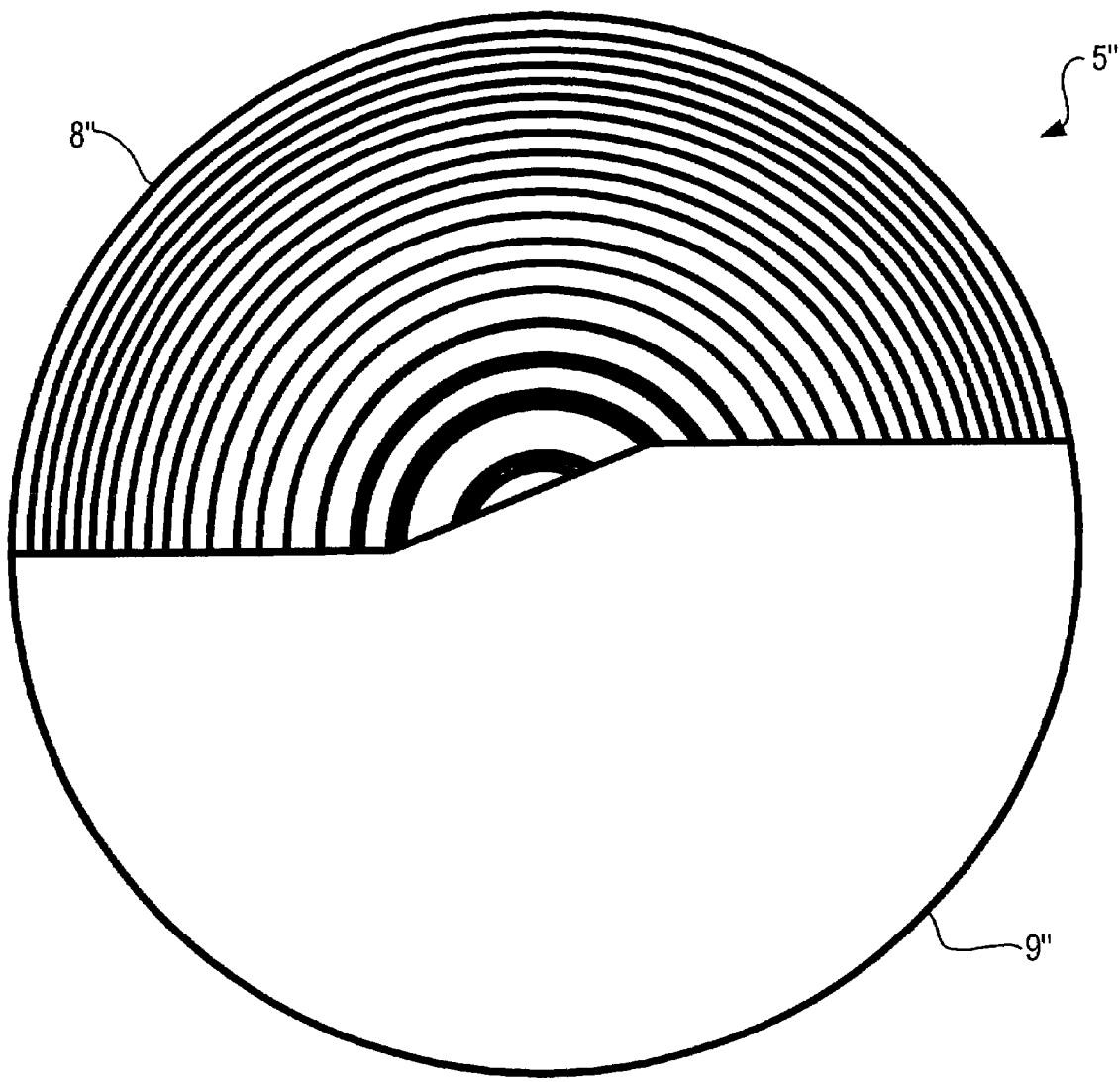
FIG. 6 is a plan view of a geometric design of a third embodiment of a lens according to the invention.
Figure 7:
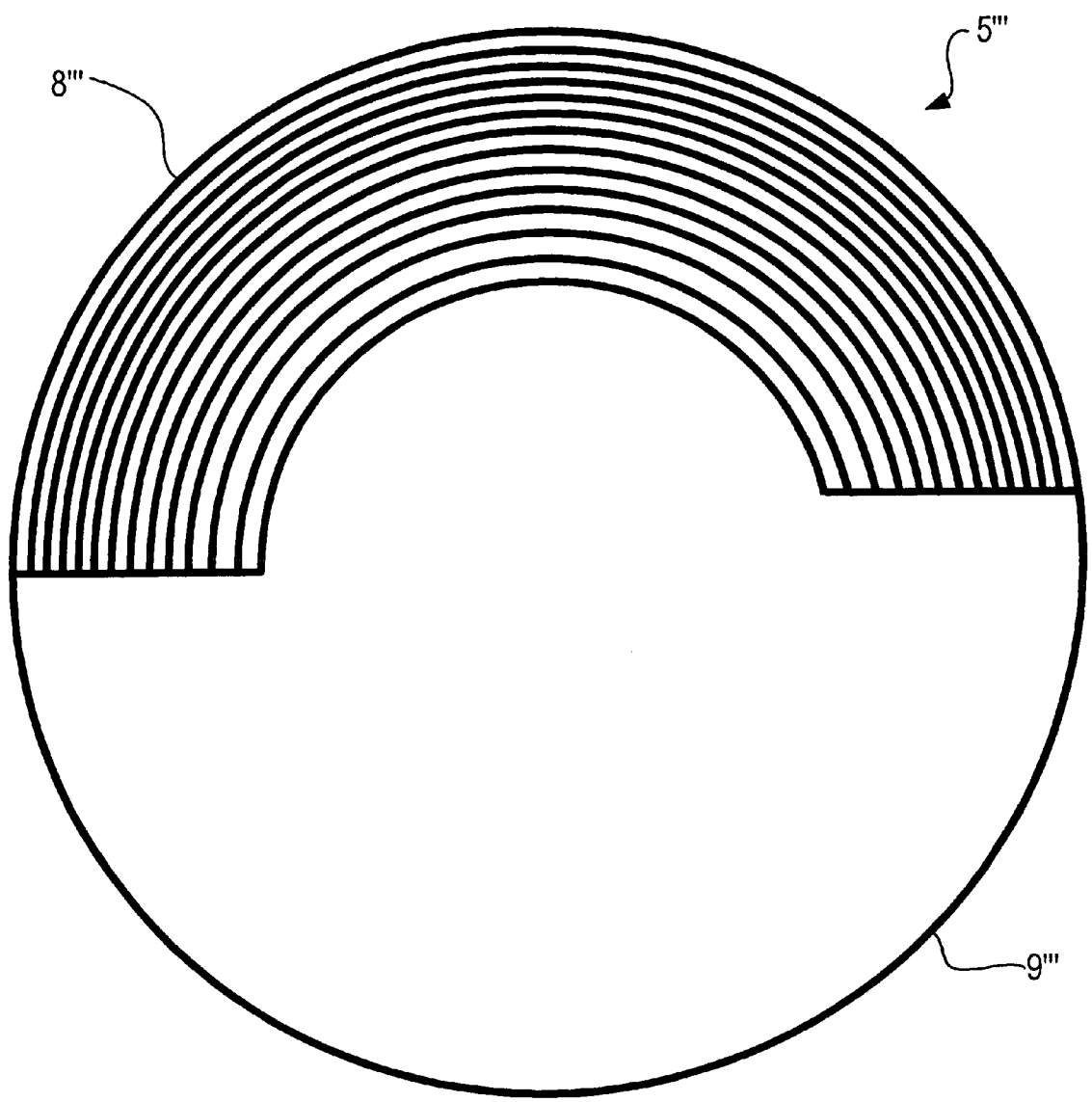
FIG. 7 is a plan view of a geometric design of a fourth embodiment of a lens according to the invention.

Lenses 5" and 5'" with modified diffractive structures 8'", 8'" were shown in FIGS. 6 and 7. These lenses 5", 5'"differ from the already described lenses 5, 5' shown in FIGS. 4a and 5, in that the diffractive structures 8", 8'" are adjusted to follow the course of the edge of the diaphragm. Because of that an additional measurable reduction of the brightness at the HV point is achieved. The geometry shown in FIGS. 6 and 7 is for headlights used in vehicles that travel on the right side of roads or streets. The geometry for left-hand travel must be a mirror image of the foregoing geometry for right-hand travel.

The surfaces 9,9',9",9'" of the lenses 5,5',5",5'" not provided with diffractive structures may be made usable, when a computer-generated hologram is arranged there.

Figure 8:
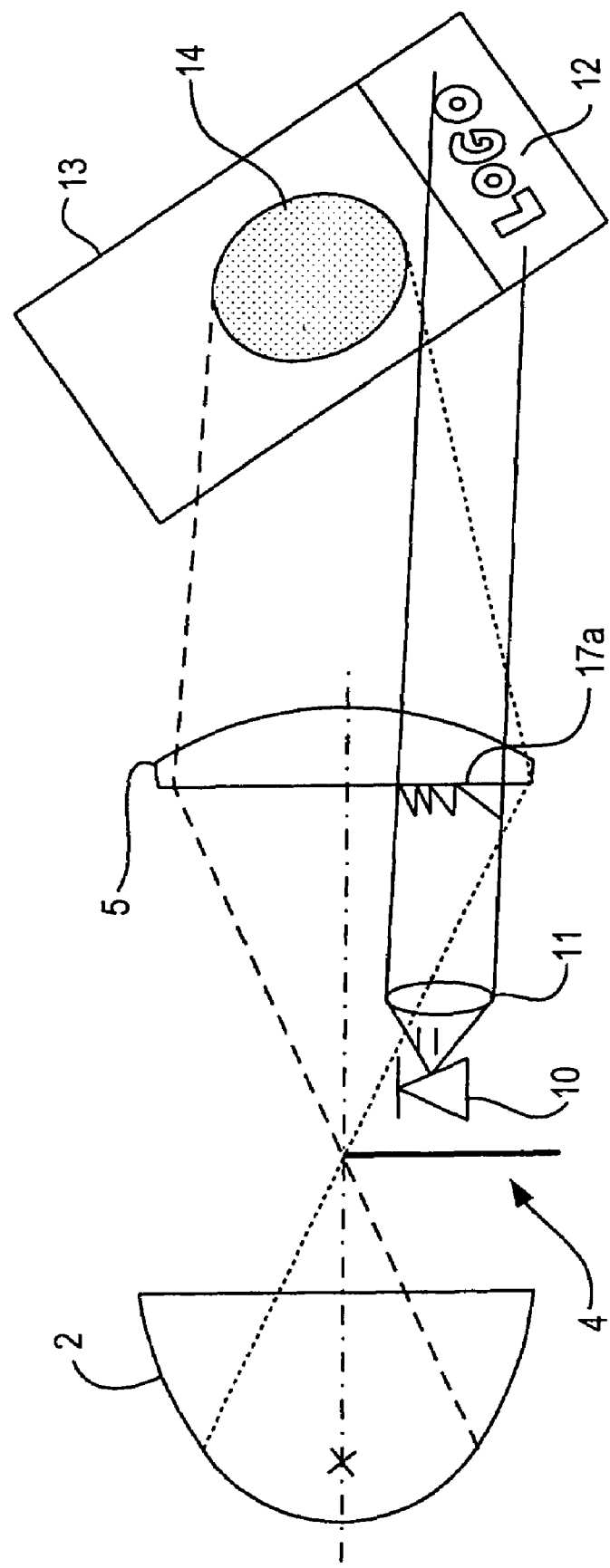
Figure 9:
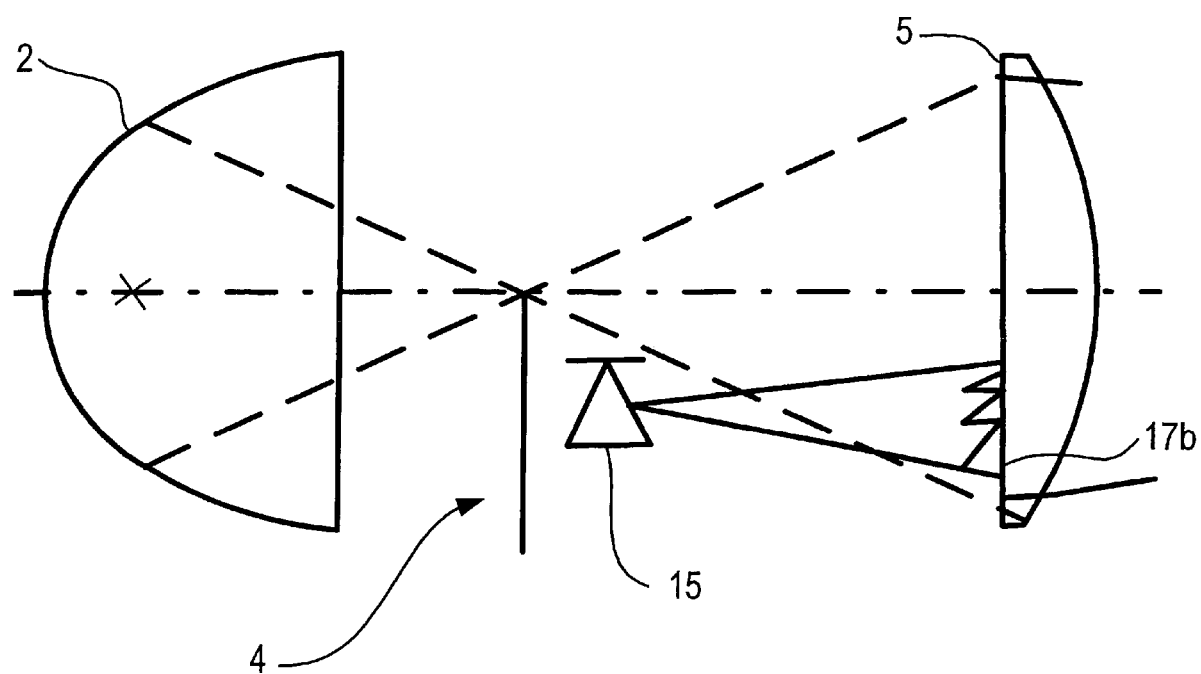

As shown in FIG. 8 it is possible to project an image, such as a logo 12, on the cover disk or plate 13 of a headlight with the help of a laser 10 and micro-optics 11 arranged downstream of or between the diaphragm 4 and the lens 5. This projection occurs below the actual light beam 14 on the cover plate 13. These projections would also be visible on the street, especially with stopped vehicles. The computer-generated hologram 17a is constructed accordingly. The computer-generated hologram 17b serves in connection with the detector 15 for control of light source aging in the embodiment shown in FIG. 9. The lighting power of the light source primarily and thus its aging or the aging of the lens that affects light performance is monitored according to the manner in which the detector 15 and the computer-generated hologram are arranged. The CGH (computer-generated hologram) 17b is arranged so that the appropriate light is focused on the detector.

Figure 10:
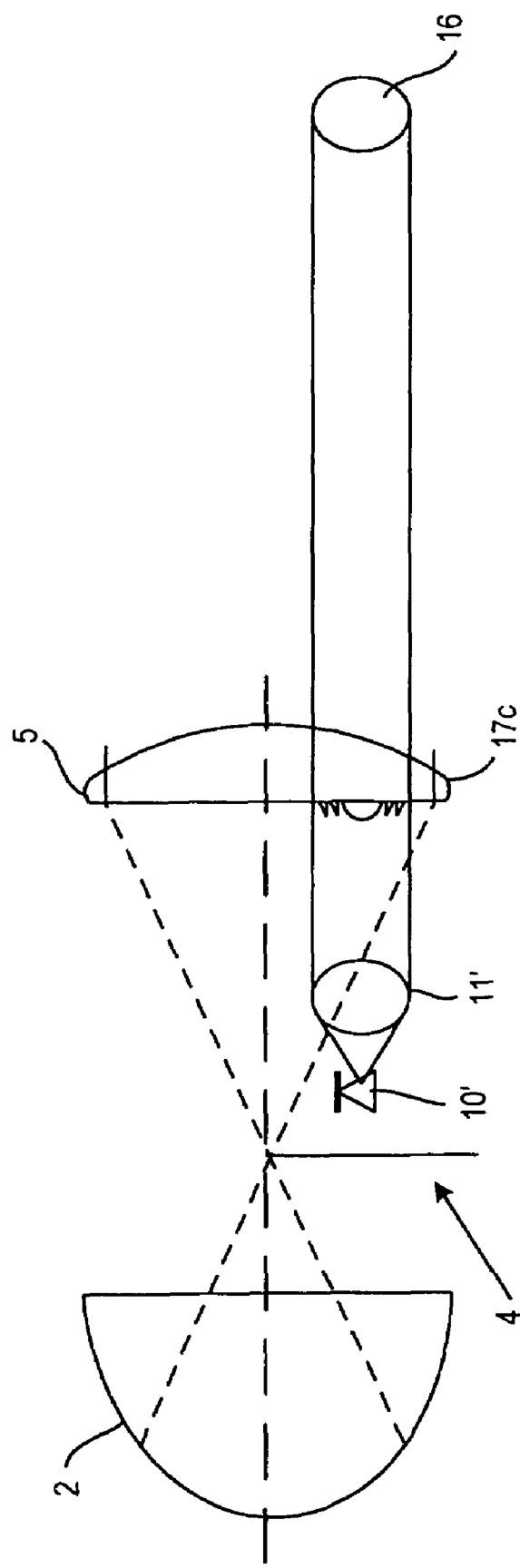

When an infrared laser 10' and micro-optics 11' arranged between the lens 5 and the diaphragm 4 Cooperate with the CGH 17c as shown in FIG. 10, the driver's visibility can be improved. The street is illuminated with infrared light 16 from the infrared laser 10'. A corresponding infrared image of the street can be taken with an unshown camera. Alternatively an infrared image can be displayed on a monitor or projected onto a windshield of the vehicle.

Figure 11:
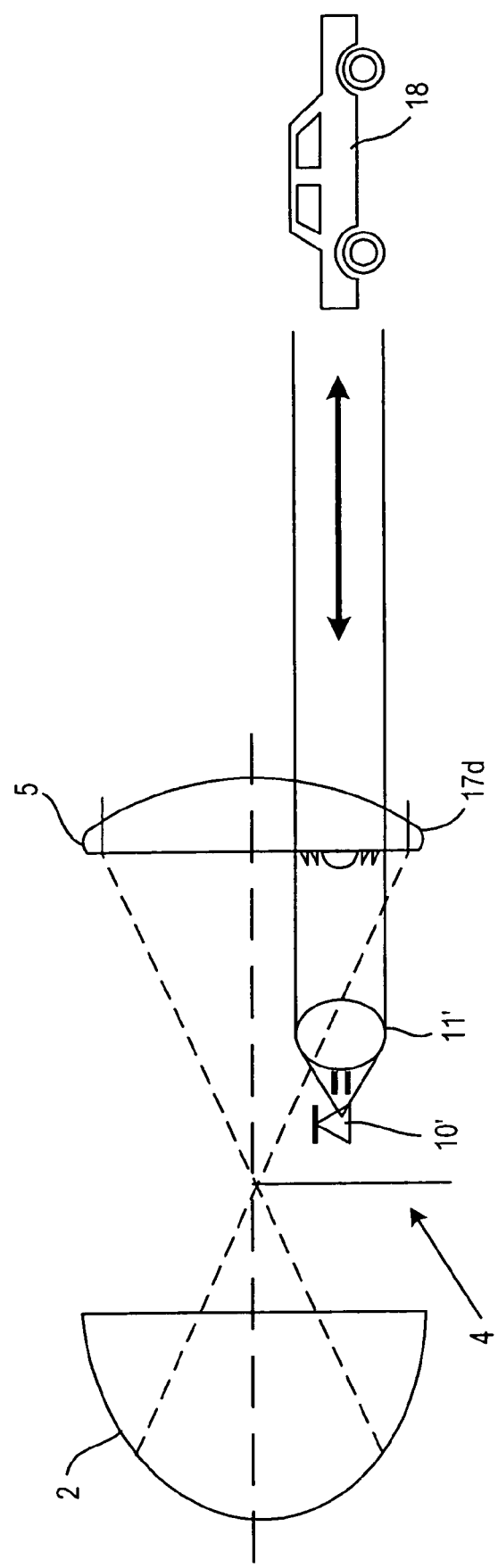

Also the distance to an object 18 located in front of the headlight can be measured (FIG. 11) with the help of an infrared laser 10' with micro-optics 11' and also the CGH 17d. When a reflected infrared signal is measured with the help of an unshown detector in a time resolved manner, i.e. the infrared laser 10' is used in a manner similar to radar, the spacing for example to an auto traveling ahead may be determined. This information can be used by an onboard computer to maintain a minimum distance between vehicles.

Figure 12:
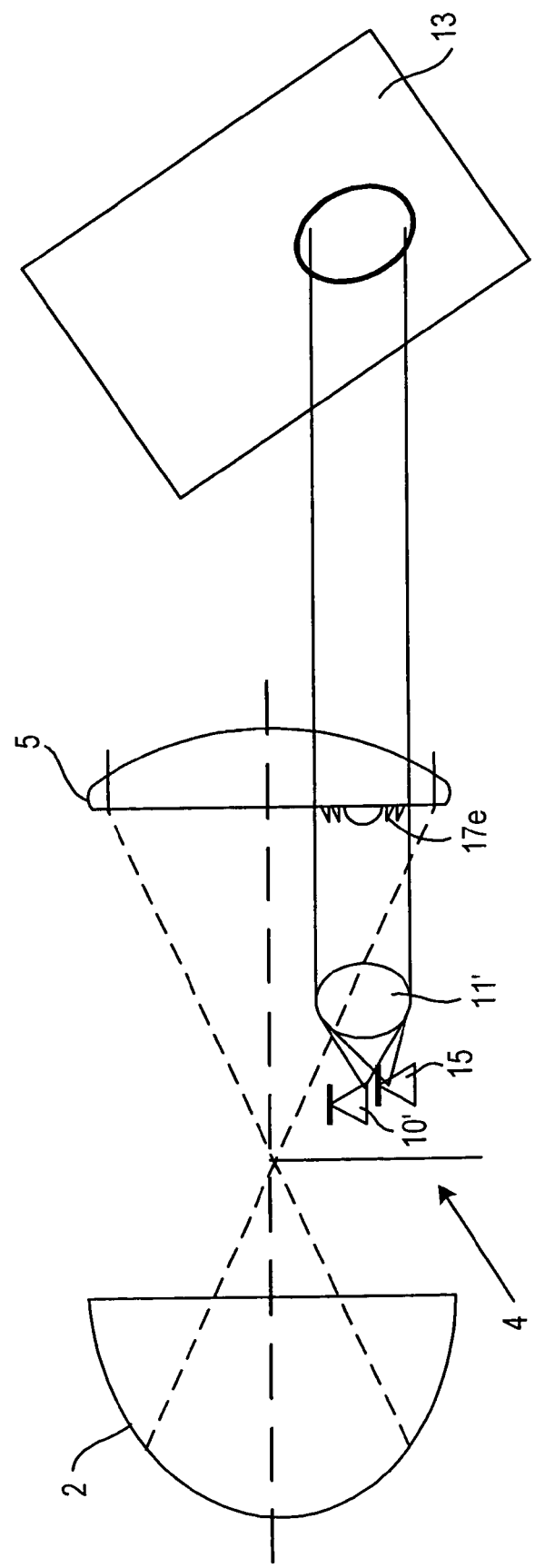

Similarly rain or snow may also be detected with an infrared laser 10' in connection with a CGH 17e and a detector 15. In this embodiment light is conducted to the cover plate (see FIG. 12). Water drops of rain and also snow crystals change the reflectivity of the cover plate 13. An onboard computer can thus use the signal from the detector 15 to e.g. automatically operate the windshield wipers.

Figure 13B:
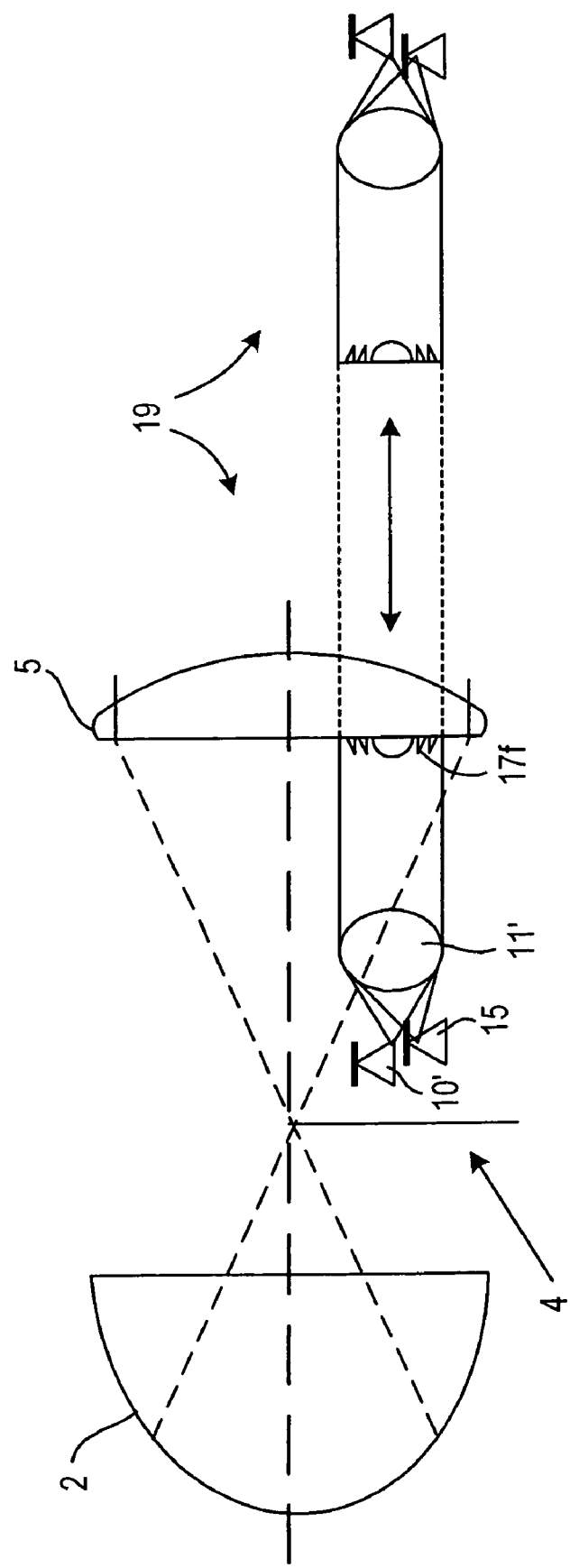

Finally complex embodiments are illustrated with the aid of FIGS. 13a, 13b. Both automobiles A and B have transceivers 19 built into the headlights of the following automobile and the taillights of the leading automobile, which send and receive two different wavelengths $\lambda 1, \lambda 2$ in order to reduce optical cross-talk. Also again infrared lasers 10' are used. The light from the lasers 10' is processed with the help of micro-optics 11' in the form of a lens or by an appropriate CGH 17*f* in a lighting apparatus and is focused by appropriate micro-optics 11' on a detector 15. Thus optical data communication between these automobiles can take place by transmission of telemetric data, including speed, acceleration and braking strength data. This information may be evaluated, for example, by an onboard computer and used to improve vehicle safety.

Most of the lenses illustrated here comprise polymethylmethacrylate (PMMA) or polycarbonate (PC) for economic reasons. The most expensive use polymethylmethacrylimide (PMMI). This latter type of lens generally has the best temperature resistance. Also the lenses made from polystyrene (PS), poly(styren-co-acrylnitrile) (SAN), cycloolefin copolymer (COC) or cycloolefin polymer (COP) or also methylpentene copolymer (PMP) or also polyethylene terephthalate (PET) are unmatched or stand apart. The lenses made by pressing, as illustrated in FIGS. 5 and 7, have an oxidic or a silicate multi-component glass composition.

The disclosure in German Patent Application 103 33 370.3 of Jul. 23, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a lighting apparatus, lens and method of making the lens, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A lighting apparatus of a vehicle, said lighting apparatus comprising a light source (3);

a lens (5) arranged in relation to the light source, so that light from the light source passes through said lens, said lens (5) having a planar side closest to the light source and a convex side opposite from the planar side, said convex side of said lens facing away from the light source (3);

a diaphragm (4) arranged between the light source (3) and the lens (5) so as to mask a region of said planar side of said lens, said lens (5) having a computer-generated hologram (17*a*) arranged only in said region of said planar side of said lens masked by said diaphragm (4) and said lens (5) having a diffractive structure arranged only on another region of said planar side of said lens that is not masked by the diaphragm (4);

a laser (10) and micro-optics (11), said laser (10) and said micro-optics being both arranged between said diaphragm (4) and said lens (5); and a cover disk or plate (13) arranged on a side of said lens (5) opposite from said light source (3), so that light generated by said laser (10) is projected via the micro-optics (11) through said computer-generated hologram (17*a*) on said lens (5) to produce an image (12) on said cover disk or plate (13).

2. The lighting apparatus as defined in claim 1, further comprising a reflector (2) in which said light source (3) is mounted.

3. A lighting apparatus of a vehicle, said lighting apparatus comprising a light source (3);

a lens (5) arranged in relation to the light source, so that light from the light source passes through said lens, said lens (5) having a planar side closest to the light source and a convex side opposite from the planar side, said convex side of said lens facing away from the light source (3);

a diaphragm (4) arranged between the light source (3) and the lens (5) so as to mask a region of said planar side of said lens; and a detector (15) arranged between the diaphragm (4) and the lens (5), said detector comprising means for detecting aging of the light source that affects lighting performance of the light source (3);

in which said lens (5) has a computer-generated hologram (17*b*) arranged only in said region of said planar side of said lens masked by said diaphragm (4) and said lens (5) has a diffractive structure arranged only on another region of said planar side of said lens that is not masked by the diaphragm (4); and in which said computer-generated hologram (17*b*) is arranged to focus at least a portion of the light from the light source on the detector (15) in order to detect aging of said light source (3).

4. The lighting apparatus as defined in claim 3, further comprising a reflector (2) in which said light source (3) is mounted.

5. A lighting apparatus of a vehicle, said lighting apparatus comprising a light source (3);

a lens (5) arranged in relation to the light source, so that light from the light source passes through said lens, said lens (5) having a planar side closest to the light source and a convex side opposite from the planar side, said convex side of said lens facing away from the light source (3);

a diaphragm (4) arranged between the light source (3) and the lens (5) so as to mask a region of said planar side of said lens;

an infrared laser (10') and micro-optics (11'), said infrared laser (10') and said micro-optics (11') being both arranged between said diaphragm (4) and said lens (5); and an infrared radiation detector (15) arranged between the diaphragm and the lens;

in which said lens (5) has a computer-generated hologram (17*c*, 17*d*, 17*e*) arranged only in said region of said planar side of said lens masked by said diaphragm (4) and said lens (5) has a diffractive structure arranged only on another region of said planar side of said lens that is not masked by the diaphragm (4); and in which said infrared laser (10') produces an infrared beam and is arranged so that said infrared beam is projected via said micro-optics (11') through said computer-generated hologram (17c) and infrared radiation of said infrared beam is reflected from an object in front of the lighting apparatus and detected by said infrared radiation detector in order to improve visibility, to measure distance to said object, or to detect rain or snow.

6. The lighting apparatus as defined in claim 5, further comprising a reflector (2) in which said light source (3) is mounted.

* * * * *